(12) United States Patent
Lutjen et al.

(10) Patent No.: US 7,665,961 B2
(45) Date of Patent: Feb. 23, 2010

(54) TURBINE OUTER AIR SEAL

(75) Inventors: Paul M. Lutjen, Kennebunkport, ME (US); John D. Wiedemer, Glastonbury, CT (US); James N. Knapp, Sanford, ME (US); Dominic J. Mongillo, Jr., West Hartford, CT (US); Christopher R. Joe, Wethersfield, CT (US); Blake J. Luczak, Manchester, CT (US); Gary L. Grogg, South Berwick, ME (US); Michael F. Benamati, Saco, ME (US)

(73) Assignee: United Technologies Corporation, Hartford, CT (US)

( * ) Notice: Subject to any disclaimer, the term of this patent is extended or adjusted under 35 U.S.C. 154(b) by 414 days.

(21) Appl. No.: 11/605,586

(22) Filed: Nov. 29, 2006

(65) Prior Publication Data

US 2008/0124214 A1    May 29, 2008

Related U.S. Application Data

(63) Continuation-in-part of application No. 11/606,301, filed on Nov. 28, 2006, now abandoned.

(51) Int. Cl.
*F01D 5/08* (2006.01)

(52) U.S. Cl. ............... 415/173.1; 415/115; 415/173.4; 415/173.5; 415/914; 416/97 R; 416/241 R

(58) Field of Classification Search ............... 415/115, 415/116, 173.1, 173.4, 173.5, 914; 416/97 R, 416/241 R
See application file for complete search history.

(56) References Cited

U.S. PATENT DOCUMENTS

| | | | | |
|---|---|---|---|---|
| 3,365,172 | A * | 1/1968 | Howald et al. | 415/117 |
| 4,466,772 | A | 8/1984 | Okapuu et al. | |
| 4,714,406 | A * | 12/1987 | Hough | 415/173.5 |
| 5,538,393 | A | 7/1996 | Thompson et al. | |
| 5,609,469 | A | 3/1997 | Worley et al. | |
| 5,649,806 | A * | 7/1997 | Scricca et al. | 415/115 |
| 5,707,206 | A * | 1/1998 | Goto et al. | 415/173.1 |
| 6,155,778 | A * | 12/2000 | Lee et al. | 415/116 |
| 6,350,102 | B1 * | 2/2002 | Bailey et al. | 415/173.5 |
| 6,945,749 | B2 * | 9/2005 | De Cardenas | 415/115 |

* cited by examiner

*Primary Examiner*—Igor Kershteyn

(57) ABSTRACT

A turbine outer air seal includes, in a radially inner major surface thereof, at least one circumferential groove accommodating a plurality of holes which supply air for film cooling the radially inner surface of the air seal.

12 Claims, 4 Drawing Sheets

TURBINE OUTER AIR SEAL

CROSS REFERENCE TO RELATED APPLICATION

This application is a Continuation-in-Part of the parent application Ser. No. 11/606,301 entitled "Turbine Outer Air Seal", filed on Nov. 28, 2006, now abandoned, and claims the benefit of the filing date thereof.

This invention was made with Government support under Contract No. F33615-03-D-2354 awarded by the United States Air Force and Contract No. N00019-02-C-3003 awarded by the United States Navy. The Government has certain rights in the invention.

BACKGROUND OF THE INVENTION

This invention relates generally to gas turbine engines and more specifically to outer air seals employed in turbine shrouds of such engines.

BACKGROUND ART

Axial flow of gas turbine engines include a compressor, a combustor, and a turbine spaced sequentially along a longitudinal axis. An annular flow path extends axially through the compressor, combustor and turbine. The compressor includes an array of rotating blades which act on air to compress the air, a portion thereof entering the combustor where it is mixed with fuel and ignited. The products of combustion then flow through the turbine. The turbine includes alternating arrays of vanes and rotating blades. The turbine extracts energy from the hot gases to drive the compressor and provide shaft work or thrust for powering associating equipment such as electrical generators or aircraft.

To optimize the efficiency of the turbine, the products of combustion are confined to an annular space defined by inner and outer turbine shrouds. Typically, the inner turbine shroud comprises a plurality of platforms integral with the turbine blades. The platform of each blade mates with a platform on an adjacent blade to form an inner flow surface for the hot gases. The outer shroud typically comprises a ring like assembly of outer air seals disposed radially outwardly of, but in close radial proximity to the outer tips of the rotating turbine blades.

Since the turbine outer air seals are in direct contact with the hot gases, they must be cooled to maintain their temperature within acceptable limits. Known cooling methods have included impingement cooling by injecting air bled from the compressor onto the back (radially outer surfaces) of the outer air seals as well as film cooling wherein compressor bled air is conducted through cooling holes in the outer air seals to the inner surfaces thereof to form a film which, to an extent, thermally insulates the outer air seals from the hot combustion gases.

As the output power and efficiency demands placed on modern gas turbine engines increase, operating clearances between the tips of the turbine blades and the outer air seals have been reduced to such an extent that start up of a new engine or operation of an engine outside the normal operational envelope thereof, can actually result in the turbine blade tips rubbing against the outer air seals. This rubbing has the effect of scraping off air seal material (typically high temperature or super-alloys). The outer air seal material scraped off by the turbine blade tips during such rubbing may be redeposited within the film cooling holes in the outer air seals, partially or completely clogging the holes and thus severely restricting or cutting off the flow of cooling air therethrough. As the operating temperature of modern gas turbine engines increases as a result of ever increasing output demands thereof, it is increasingly critical that the flow of film cooling air through the cooling holes not be restricted or cut off by such tip rubbing.

In response to the need to prevent such cooling hole blockage due to turbine blade tip rubbing, it has been proposed to locate the film cooling hole openings within oblique (with respect to a radial plane through the engine) grooves formed within the inner surfaces of the outer air seals thereby shielding the cooling hole openings from rub material. Such an arrangement presents some drawbacks. For example, combustion gas flow through such oblique grooves may result in less than optimal combustion gas boundary layer conditions which provide sealing between the turbine blade tips and the air seals. Moreover, and perhaps more importantly, since the outer air seals are generally annular in shape, machining such oblique grooves in the radially inner surfaces thereof is an extremely complex and costly operation, typically involving sophisticated and therefore very costly multi-axis grinding machines or more time-consuming electrical discharge machining operations. Moreover, maintaining consistent groove dimensions may be difficult if not impossible with such grinding techniques.

Accordingly, it is desired to provide turbine outer air seals with film cooling holes which are protected from blockage thereof by blade tip rubbing in such a way that does not adversely effect the fluid seal between the blade tips and associated outer air seals and which can be manufactured economically with ordinary manufacturing equipment.

DISCLOSURE OF INVENTION

In accordance with the present invention, film cooling holes in turbine blade outer air seals are disposed within circumferential grooves (parallel to the direction of blade rotation) in the radially inner major surfaces of the blade outer air seals. Such grooves can be economically manufactured with conventional, grinding machinery. Moreover, it is believed that such circumferential grooves provide an optimum fluid seal between the turbine blade tips and the outer air seals by maximizing the thickness of the boundary layer of combustion gases flowing through the turbine, thereby enhancing turbine efficiency, and may likely result in a grooving of the tips of corresponding turbine blades, to even further enhance turbine efficiency. The cooling holes may be of any desired shape such as quadrilateral in cross section with square or rectangular openings into the air seal grooves. The grooves are U-shaped in cross section and may include sidewalls which are beveled in such a way that the groove openings are wider than a radially outer surface (floor) thereof for stress relief. The radially inner surface of the turbine outer air seals of the present invention may be coated with any of various known thermal barrier coatings, which, in the case of the forward-most and aft-most grooves, may form the forward-most and aft-most sidewall, thereof, respectively.

DETAILED DESCRIPTION OF THE INVENTION

Figure 1:
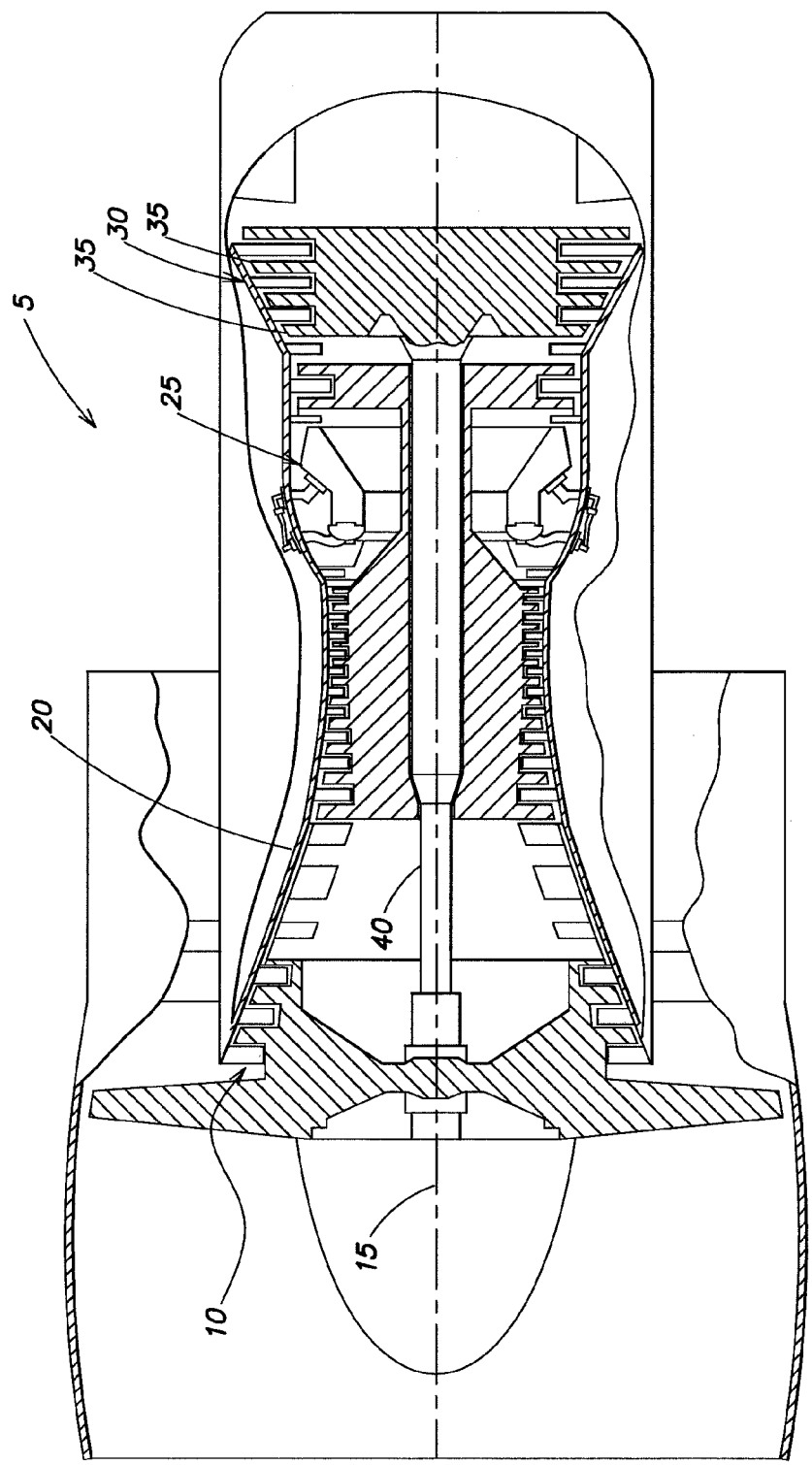
FIG. 1 is a schematic side view, partially in cross section of a gas turbine engine.

FIG. 1 illustrates a gas turbine engine 5 having an annular flow path 10 disposed about a longitudinal axis 15. A compressor 20, combustor 25 and turbine 30 are spaced along the axis, with the flow path 10 extending sequentially through each of those systems. The turbine 30 includes a plurality of rotor assemblies 35 that act on hot combustion gases flowing from the combustor through annular flow path 10 to capture energy from the combustion gases to drive rotor assembles 35. A portion of this energy is used to drive compressor 20 via a pair of rotating shafts 40 interconnecting the turbine and compressor to provide energy to compress air entering compressor 20.

Figure 2:
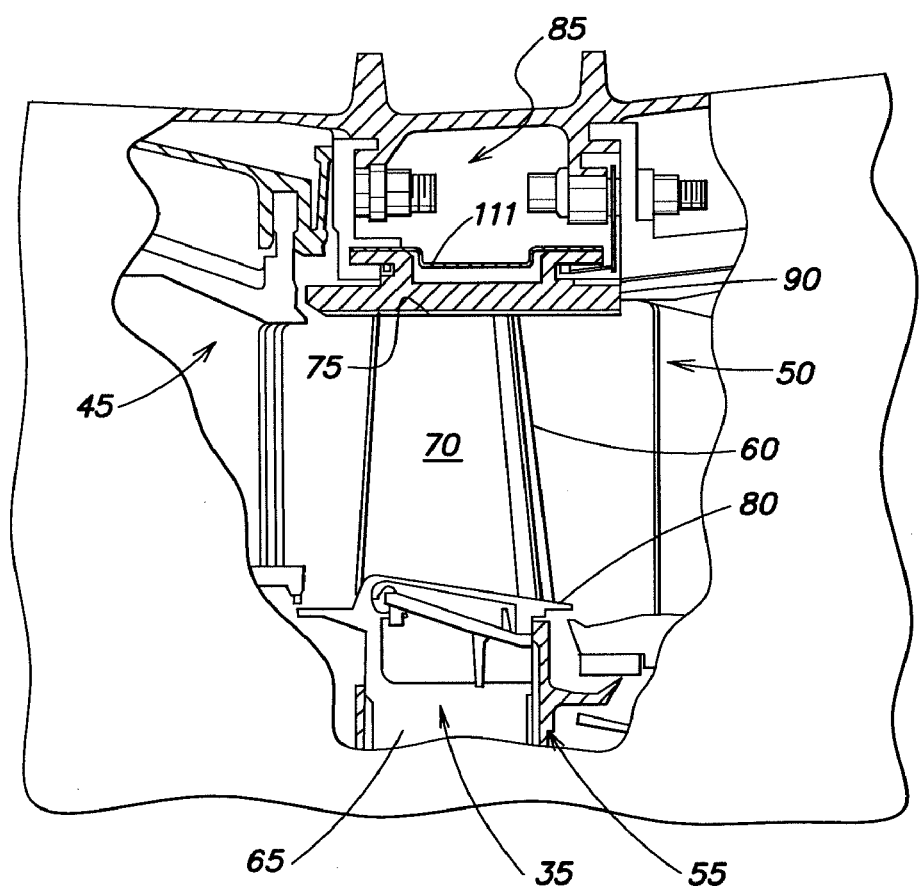
FIG. 2 is a side view of a turbine stator assembly including a shroud formed in part by the outer air seals of the present invention.

Referring to FIG. 2, rotor assembly 35 is axially positioned between an upstream vane assembly 45 and a downstream vane assembly 50. Rotor assembly 35 includes a rotating disk 55 having a plurality of rotor blades 60 extending radially therefrom. Each of the rotor blades 60 includes a root portion 65 an airfoil portion 70 having a tip 75 and an inner platform 80. The root portion 65 retains the blade to disk 50 during rotation of the rotor assembly 35. The airfoil portion 70 extends radially outwardly through the flow path 10 and provides a flow surface, which is acted upon by the products of combustion flowing through the turbine to drive rotor assembly 35. The inner platform 80 extends laterally from the blade and mates with similar platforms (not shown) of circumferentially adjacent blades to define a radially inner boundary to the flow of combustion gases through the turbine. A turbine shroud 85 extends circumferentially about and radially outwardly of rotor assembly 35 and includes a plurality of turbine outer air seals 90, which comprise a radially outer boundary for the flow of combustion gases through the turbine.

Figure 3:
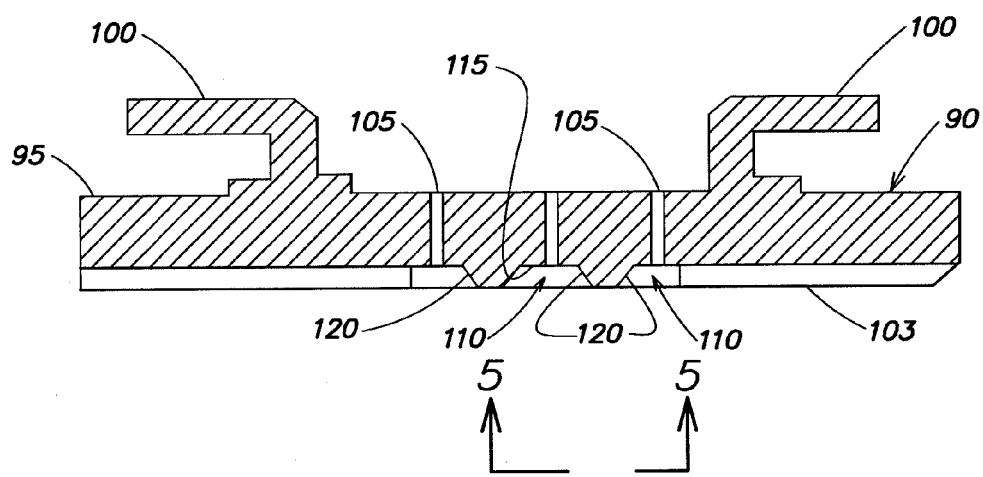
FIG. 3 is a sectioned elevation of the turbine outer air seal of the present invention.
Figure 4:
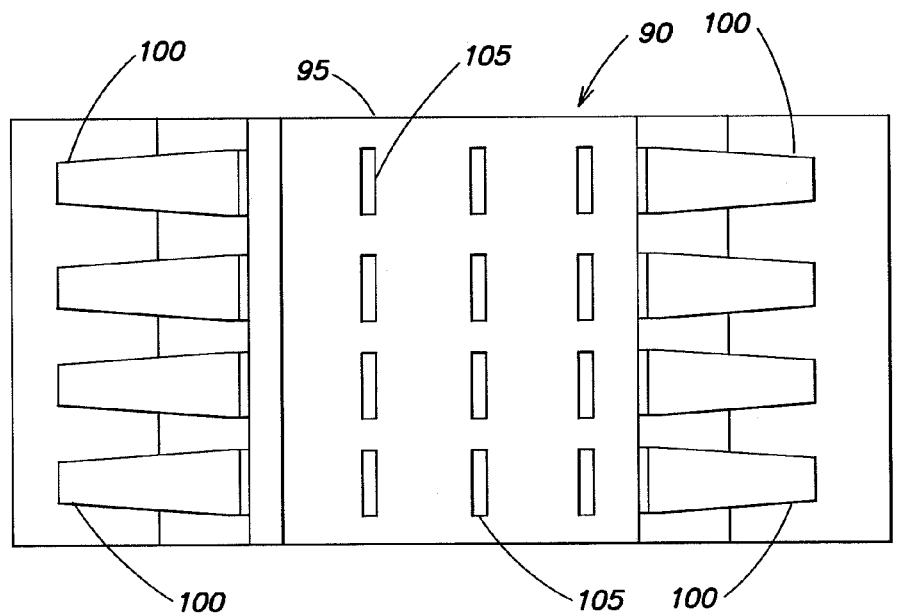
FIG. 4 is a radially outer plane view of the turbine outer air seal of the present invention.

Referring to FIGS. 3 and 4, each turbine outer air seal 90 comprises a substrate 95 having a plurality of before and aft extending hooks 100 extending radially outwardly therefrom as a means to retain the outer air seal to the remainder of the shroud assembly. All or a portion of the radially inner surface of substrate 95 may be coated with a thermal barrier coating 103 which comprises any of various known ceramic coatings and the like applied to conventional air seals in modern gas turbine engines.

As set forth hereinabove, since the turbine outer air seals 90 are maintained in continuous contact with the products of combustion from combustor 25, these components are heated to extremely high temperatures and therefore must be cooled with cooling air which is typically supplied as bleed air from compressor 20. Despite the presence of thermal barrier coating 103, the radially inner face of the turbine outer air seal must be cooled by film cooling, that is, by providing the radially inner surface of the air seal with a film of cooling air spread thereover. This cooling air is provided through cooling holes 105 which extend from the radially inner surface of the air seal to a radially outer surface thereof which, with seal 111 (see FIG. 2) forms a plenum which supplies cooling air pumped thereinto by the compressor.

As further set forth hereinabove, power output and efficiency demands of modern gas turbine engines require that as tight a clearance as possible be maintained between turbine blade tip 75 and the radially inner surface of outer air seal 90. This clearance is typically so tight, that upon start up of a new engine and under certain operating conditions, particularly those outside the operating envelope of the engine, the blade tip may actually rub against the inner surface of the air seal scraping off portions of the air seal inner surface and blade tip. Without some means of protecting the cooling hole openings from such scraping, scraped material from the air seal and turbine blade tip may deposit itself within the cooling hole openings clogging the same, and therefore severely restricting the flow of cooling air through cooling holes 105. This would of course adversely affect the cooling of the outer air seal to a degree that turbine failure is at risk.

Figure 5:
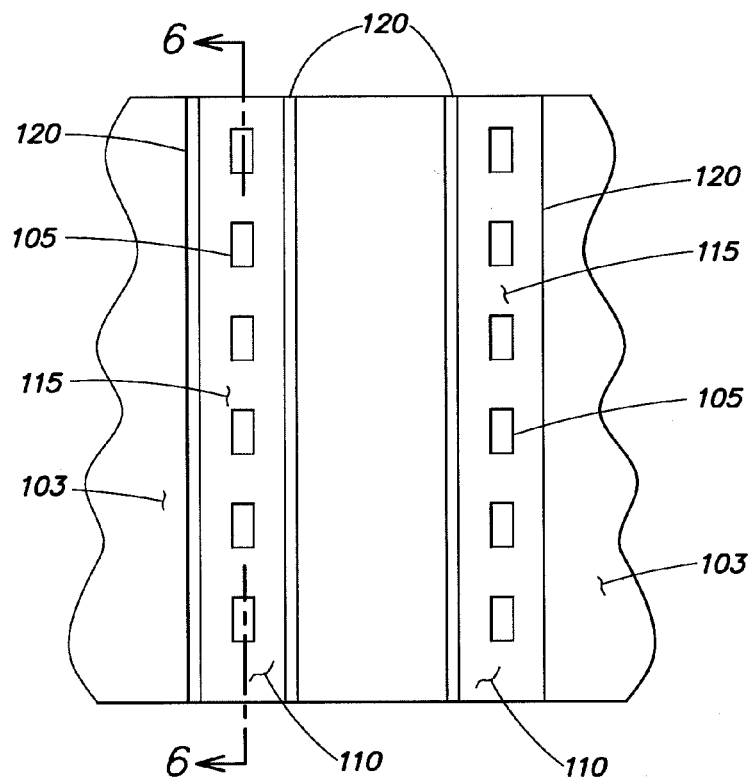
FIG. 5 is an enlarged, fragmentary, radially inner plan view of the turbine outer air seal of the present invention.

In accordance with the present invention and with particular reference to FIG. 5, a plurality of circumferential grooves 110 having radially outer surfaces 115 and side surfaces 120, are provided in the inner major surface of the air seal, the cooling hole outlets opening onto the radially outer surfaces 115 within the interior of the grooves. Thus, the grooves shelter the openings of the cooling holes and block the deposit of metallic scrapings from the blade tip-air seal rub from clogging the cooling hole openings.

It has been determined that the circumferential (i.e. parallel to blade rotation) orientation of the grooves enhances the thickness of the boundary layer of the working fluid at the radially inner surface of the air seal. This boundary layer establishes a fluid seal between the tips of the turbine blades and the outer air seal and thus, enhancing the thickness thereof minimizes leakage of working fluid around the blade tips thereby enhancing the overall efficiency of the turbine and the associated engine. While oblique grooves are known in the prior art, it is believed that circumferential grooves offer better fluid sealing between the blades and outer air seals.

Furthermore, such circumferential grooves, will, when rubbed by the tips of adjacent blades, form grooves in those blade tips, particularly when such rubbing is uneven. Such grooving of the blade tips results in a further reduction of combustion gas leakage around the blade tips and thus, a further enhancement of turbine efficiency.

The circumferential orientation of grooves 110 is also beneficial in that it allows the grooves to be economically formed such as by known investment casting processes or by grinding with conventional and relatively inexpensive grinding machinery. Oblique grooves in the air seal would require time consuming grinding with sophisticated and expensive multi-axis grinding machines, thereby contributing significantly to the cost of manufacture of the turbine and compromising the consistently accurate groove dimensions required for adequate film cooling and boundary layer maintenance.

Figure 6:
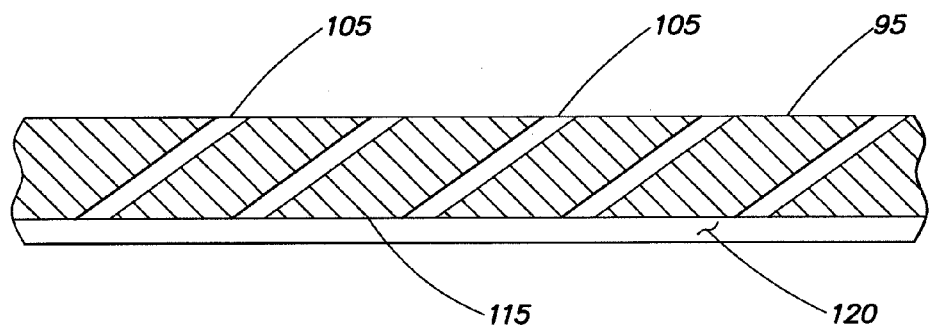
FIG. 6 is a sectional view of the turbine outer air seal of the present invention taken along line 6-6 of FIG. 5.

Referring to FIGS. 5 and 6, the cooling holes may take any of various shapes; in the preferred embodiment, the cooling holes are formed by EDM (electrical discharge machining) which lends itself to the manufacture of cooling holes having a quadrilateral cross section such as a square or rectangular cross section. The cooling holes may also be formed by laser drilling or equivalent techniques. As best seen in FIG. 6, to establish a film of cooling fluid over the radially inner surface of the air seal, the cooling holes are sloped (angularly offset) in a generally circumferential direction. However, it will be understood that where desirable, the cooling hole slope may have an axial component as well. It will be noted that since the cooling holes are circumferentially sloped and the grooves are circumferentially oriented, the width of the grooves required to accommodate the cooling hole openings is minimized, thereby reducing the risk of any compromise in the fluid boundary layer seal between the blade and air seal from an excessively wide groove.

As best seen in FIG. 3, the sidewalls 120 of the grooves may be beveled to define an opening which is wider than the radially outer surface thereof through which the cooling holes exit the seal for enhanced stress relief. Also, as best seen in FIGS. 3 and 5 the thermal barrier coating 103 may be applied for and aft of the grooves such that the forward most sidewall of the forward-most groove and the aft most sidewall of the aft-most groove are defined by the thermal barrier coating itself.

While a specific embodiment of the present invention has been illustrated and described, it will be appreciated that various modifications thereof will suggest themselves to those skilled in the art. For example, while three grooves have been shown, it will be appreciated that greater or fewer number grooves may be employed as will be determined by the turbine blade configuration and operating parameters of the turbine. Moreover, while rectangular cooling holes have been shown, as would result in the manufacture thereof by electrical discharge machining methods, cooling holes of various other cross sections such as round cooling holes resulting from drilling, may also be employed without departing from the present invention. In addition, though the grooves are demonstrated as being formed in the metallic substrate, it will be appreciated that the same could be formed in coatings or other surface treatments on the turbine outer air seal surface. Therefore, it is intended by the appended claims to cover these and any other modifications, which fall within the true spirit and scope of this invention.

Having thus described the invention, what is claimed is

1. In a gas turbine engine, a turbine blade outer air seal comprising:
   a radially inner major surface facing a corresponding turbine blade having a tip portion, said radially inner major surface including at least one circumferentially extending groove in radial alignment with said blade tip portion and a plurality of circumferentially spaced cooling holes disposed in said groove;
   wherein said cooling holes are angularly offset from a radial direction, and wherein said angular offset of said cooling holes is in a circumferential direction; and
   wherein said angular offset of said cooling holes is also in an axial direction.

2. The turbine blade outer air seal of claim 1 wherein said cooling holes are cast into said outer air seal.

3. The turbine blade outer air seal of claim 1 wherein said cooling holes are formed into said outer air seal by electrical discharge machining.

4. The turbine blade outer air seal of claim 1 wherein said cooling holes are formed into said outer air seal by laser drilling.

5. The turbine blade outer air seal of claim 1 wherein said cooling holes are of a generally quadrilateral cross section.

6. The turbine blade outer air seal of claim 1 wherein said radially inner major surface of said turbine outer air seal forward and aft of said at least one circumferentially extending groove is coated with a thermal barrier coating.

7. The turbine outer air seal of claim 6 wherein each circumferential groove is generally U-shaped in cross section and comprises a pair of generally opposed side surfaces and a radially outer surface joining said opposed side surfaces along the radially outer edges thereof, and wherein said side surfaces comprise an edge portion of said thermal barrier coating.

8. In a gas turbine engine, a turbine outer air seal having a radially inner major surface facing a tip portion of a corresponding turbine blade, said radially inner major surface including a longitudinal array of a plurality of circumferentially extending grooves in radial alignment with said blade tip portion, each of said grooves including along a radially outer wall thereof, a circumferential distribution of cooling holes, said cooling holes being angularly offset in a circumferential direction from a normal to said radially inner major surface; and
   wherein said angular offset of said cooling holes is also in an axial direction.

9. The turbine outer air seal of claim 8 wherein said cooling holes are rectangular in cross section.

10. The turbine outer air seal of claim 8 wherein said radially inner major surface thereof is coated with a thermal barrier coating longitudinally forward and aft of said array of circumferentially extending grooves.

11. The turbine outer air seal of claim 10 wherein each of said circumferential grooves is generally U-shaped in cross section and comprises a pair of generally opposed side surfaces joined by said radially outer surface, the forward-most and aft-most side surfaces of the forward-most and aft-most circumferential grooves comprising an edge of said thermal barrier coating.

12. The turbine outer air seal of claim 11 wherein said side surfaces of said grooves are beveled such that the openings of said grooves are wider than said radially outer surface thereof.

* * * * *